United States Patent [19]
Barr et al.

[11] Patent Number: 5,408,099
[45] Date of Patent: Apr. 18, 1995

[54] GATED IMAGE INTENSIFIERS FOR ACTIVE IMAGING OF REFLECTORS BY DAY OR NIGHT

[75] Inventors: Dallas N. Barr, Woodbridge; John E. Nettleton, Fairfax Station; Brian C. Redman, Alexandria; Clifton S. Fox, Woodbridge, all of Va.

[73] Assignee: The United States of America as represented by the Secretary of the Army, Washington, D.C.

[21] Appl. No.: 128,496

[22] Filed: Sep. 7, 1993

[51] Int. Cl.⁶ ............................................... G01S 17/74
[52] U.S. Cl. .................................. 250/341.8; 250/330
[58] Field of Search ....................... 250/341, 330, 341.8

[56] References Cited

U.S. PATENT DOCUMENTS

| | | | |
|---|---|---|---|
| 4,368,979 | 1/1983 | Ruell | 356/71 |
| 5,013,917 | 5/1991 | Ulich | 250/330 |

Primary Examiner—Constantine Hannaher
Attorney, Agent, or Firm—Milton W. Lee; John E. Holford; Anthony T. Lane

[57] ABSTRACT

Lightweight low power IR locater for reflection enhanced targets with ≈20 microsecond pulsed IR diode laser and 26 40 microsecond synchronized range-gated image.

9 Claims, 1 Drawing Sheet

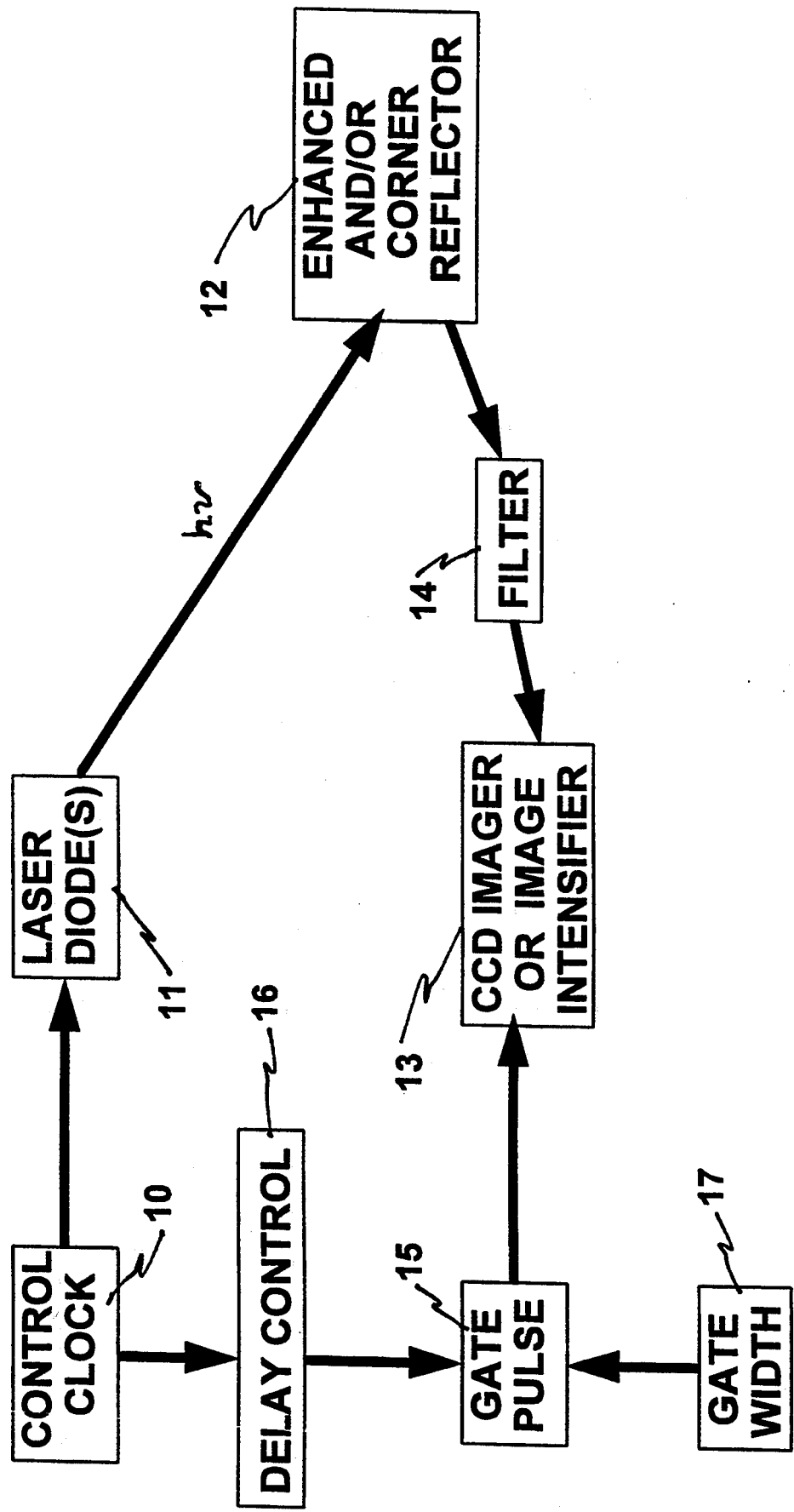

GATED IMAGE INTENSIFIERS FOR ACTIVE IMAGING OF REFLECTORS BY DAY OR NIGHT

BACKGROUND OF THE INVENTION

1. Field of the Invention

The present invention generally relates to active infrared (IR) location systems for enhanced reflectance targets. Such systems normally employ a pulsed illuminator combined with a directional optical reflection detector on a search vehicle, and a retro-reflector located on the object to be found.

2. Description of Prior Art

Electronic imaging of optical and infrared returns from retro-reflectors such as corner cubes, "Scotchlite" or other similar devices is severely limited in daylight by solar background illumination. The use of a laser and a wavelength matched narrow bandpass filter on the receiver can significantly improve performance, but the sensor will still suffer from reduced performance during the day. Even with this technique, daylight background radiation still remains a limiting factor which previously could be overcome by using high average power lasers. This leads to complexities in the laser design such as the need for cooling equipment and large power supplies, both of which add cost and weight. Further, the use of additional power compounds the eye-safety difficulties. What is needed in this instance is a reliable location system of the type described above which requires an illuminator that emits a very low average power.

It is therefore one object of the invention to provide a method of locating friendly reflectors which provides a high signal to background ratio during both dark night and bright day. It is another object of the present invention to provide a system to carry out such a method.

SUMMARY OF THE INVENTION

According to the invention, the needed ratio of reflected to background radiation can be obtained by time domain filtering. This is similar to range gating in automatic target acquisition systems for moving targets, but the parameters of this system are quite different.

BRIEF DESCRIPTION OF THE DRAWING

The foregoing and other objects, aspects and advantages will be better understood from the following detailed description of a preferred embodiment of the invention with reference to the drawing, in which:

the drawing shows block diagram of the locating system.

DETAILED DESCRIPTION OF A PREFERRED EMBODIMENT OF THE INVENTION

Referring now to the drawing there is shown an active search system for cooperating targets. Operation of the system starts in a clock generator 10 which generates narrow output control pulses; e.g. rectangular pulses 20 microseconds long, with a peak current capable of driving a laser diode 11 at its maximum rating and a repetition rate matched to the field rate of a video system, if used. If a first one watt laser diode with a 60 Hz repetition rate is used, then the average output of power is 0.0012 watts. The resulting laser beam is bore sighted with an imaging receiver and the laser beam divergence is adjusted to fill most or all of the receiver's field of view. A second diode can be mounted adjacent the first by electrically connecting it in parallel to the first diode and having its radiation beam directed parallel to that of the first diode, thus substantially doubling the radiation output of the laser.

When the beam strikes a reflector 12, such as a corner reflector, the beam returns to the vicinity of the laser and is detected by the imaging receiver, which could be a CCD imager or an image intensifier 13. The user is thus provided with an enhanced view of the background with the reflector highlighted thereon. To further discriminate between the background and the reflector; a frequency, polarization or other mode selective filter 14 may be placed between the reflector and the sensor. This filter can be located on the sensor or on the reflector or on both. The filter must have a selective characteristic for the laser-target return and can be designed to selectively attenuate background radiations that tend to mask the reflector image.

The sensor is enabled by input pulses from a gate pulse generator 15 timed to include return pulses from the reflector. To this end the gate pulse generator is coupled to the output of the clock circuit 10 through a delay control 16 having an input and an output as indicated by signal arrows in the drawing. The gate pulse generator may also have a gate width or duration control 17, although a preferred embodiment has a preset fixed delay and width large enough to cover a search range of several kilometers. This arrangement is somewhat analogous to the range gate on a tracking radar, however, an image intensifier, which is the preferred sensor because of its inherent gating and imaging capability, does not provide any equivalent to the electronic target return of the radar. The target return is detected visually by the operator. The radar range gate sets a delay derived from the target return and similarly narrows the gate width as much as possible without diminishing the return. In other words there would have to be feedback circuits between the detector, the delay control and the width control, which are not practical when the detector is an image intensifier. The response of image intesifiers, electronically speaking, is more dependent on ambient background illumination than the response of radar systems.

Gated image intensifiers are not new, but the choice of the gate waveform and optical pulse shape to alleviate background problems represents a new concept in this type of imaging. Since the intensifier only works when a bias voltage is applied to it, it can be used as a very fast shutter by applying suitably short duration electrical pulses, as described above. In passive gated imaging, the fast shutter effect has been used to capture dynamic events such as a rifle bullet in flight.

Active gated imaging employs a pulsed light source such as a laser or strobe light to illuminate an area of interest. By properly timing the gate of the intensifier with respect to the clock pulse initiating each light pulse, a visible image can be formed that includes visible and IR light information only from a range interval some distance away from the sensor of the imager. This technique has been used to find the range to a target, to discriminate a target from a background, and to form silhouettes of targets against various backgrounds. When the distance to the target is known with reasonable accuracy these tasks are simple. Also, these applications have used targets with naturally occurring reflectance and have been limited in range performance by a relatively low target cross-section.

The techniques covered by the current application employ pulsed light sources, retro-reflectors and/or other types of enhanced reflectors as passive but cooperative targets. These help to maximize range performance in daylight. Considering the gate and laser timing, the "gate on" time ($T_g$) required to image the reflector is just the sum of the optical pulse duration ($T_p$) and the range uncertainty time window ($T_w$), in which the return pulse is expected to arrive (i.e. $T_g = T_p + t_w$). The energy received from the background ($E_b$) is the product of the background power ($P_b$) and the gate time; thus $E_b = P_b * T_g$. The signal energy received from the reflector ($E_s$) is just the product of the laser power received ($P_r$) and the pulse duration, $E_s = P_r * T_p$. If we form a signal to background ratio (R), and normalize the power terms, the ratio becomes:

$$R = \frac{T_p}{T_p + T_w}$$

Thus R is maximized when $T_p$ is very long compared to the target uncertainty window time, $T_w$, (e.g. the high average power continuous laser diode case). However, since low average power is highly desirable, $T_p$ should be minimized. (The average power is the product of the laser power, pulse duration and pulse rate. A constant 60 hertz pulse rate is assumed to be compatible with video field rates.) Using a typical value of $T_w = 20$ microseconds (which corresponds to a three kilometer range uncertainty) it is found that $R = 0.5$ when $T_p$ is also 20 microseconds. The laser duty cycle, however, is 20 microseconds times 60 hertz, which is only 0.0012. Thus a laser which can produce one watt of continuous power may be operated in the pulsed mode at an average power of 1.2 milliwatts and thereby sacrifice only half of the signal to background energy ratio (R). This sacrifice can be recovered, if necessary, by using a laser with twice the peak power or perhaps two lasers or an average pulsed power of 2.4 watts in the above example. Even with this increase, resulting in the same performance as a continuous wave illuminator, the gated sensor would use over 400 times less average power. The average scene illumination level, as observed by an image intensifier, is reduced by the product of the gate time and the frame rate, i.e. in this example a factor of 0.0024. However, the scene is still visible because of the gain of an image intensifier, provided operation in the linear regime is maintained.

This invention is particularly useful in military operations and similar situations involving covert activities. One example is downed aviators on land or sea. A small array of retro-reflectors mounted on survival equipment could be pinpointed by searching rescuers much more precisely than a radio beacon which is heavier and more difficult to maintain. Another example is the aircraft which can be similarly marked for easy location after a forced or crash landing. Covert landing sites can also be marked for helicopters and light aircraft to provide the only visual cues for friendly aircraft none of which could normally be seen and recognized by the enemy.

While this invention has been described in terms of preferred embodiment including a diode laser and an image intensifier, those skilled in the art will recognize that the invention can be practiced with modification within the spirit and scope of the appended claims.

Having thus described my invention, what we claim as new and desire to secure by Letters Patent is as follows:

1. An active optical infrared search system with a given field of view to locate and display reflected light images from cooperative small reflection enhanced targets within said field of view, the targets often being obscured by solar background radiation; said system comprising:
   a gated sensor responsive to light in a selected spectrum within the visible and adjacent invisible portions of the electromagnetic spectrum;
   a first pulsed diode laser mounted adjacent said sensor to radiate a narrow beam of coherent illumination into the same said field of view, said laser being capable of generating only a few watts of continuous radiation;
   a first clock pulse generator coupled to said laser for producing a train of IR search pulses having a pulse duration of the order of microseconds and a repetition frequency compatible with the frame rate of a standard video signal, thereby creating said reflected light images;
   a delay line, with a line input coupled to said first generator and a line output to provide a copy of said train for initiating a like series of gate pulses, said like series of pulses having a preselected delay that does not vary with the detection timing of said light images; and
   a second gate pulse generator coupled to said line output and said sensor for enabling said sensor over the duration of each said gate pulse, said gate pulses having durations about twice that of said search pulses.

2. A search system according to claim 1; wherein:
   the frequency of said clock pulses is 60 hertz;
   the duration of said clock pulses is approximately 20 microseconds, and;
   the duration of said gate pulses is 40 microseconds.

3. A search system according to claim 1; wherein:
   a second diode mounted adjacent said first diode is connected electrically in parallel with said first diode and has its radiation beam substantially coextensive with that of said first diode.

4. A search system according to claim 1; wherein:
   said sensor is an IR imager, whereby the return from said target is highlighted on the image of its surrounding background.

5. A search system according to claim 1; wherein:
   said sensor is an image intensifier tube.

6. A search system according to claim 1, wherein:
   said sensor is a CCD imager.

7. A search system according to claim 1, wherein:
   said sensor is an image intensifier.

8. A search system according to claim 1, wherein:
   said enhanced targets include at least one corner reflector.

9. A search system according to claim 1, wherein:
   said enhanced targets include a layer of refection enhancing fluorescent material tape.

* * * * *